(No Model.)
W. B. MARKS, J. G. LAUER & R. R. RALSTON.
SUSPENDING DEVICE FOR ELECTRIC WIRES.
No. 441,312. Patented Nov. 25, 1890.
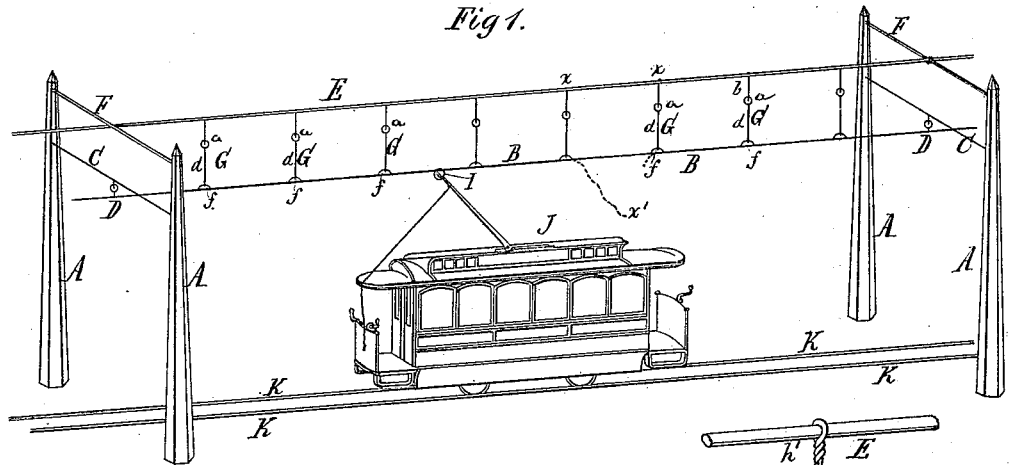
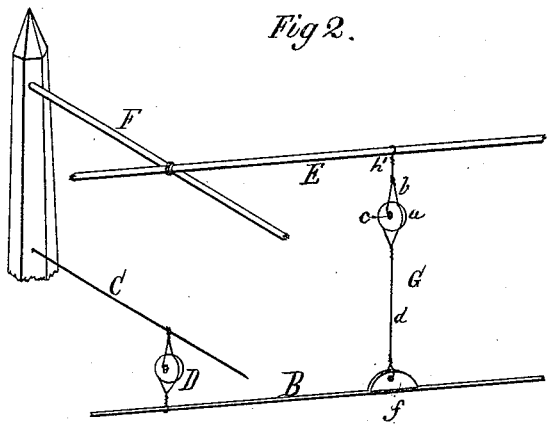
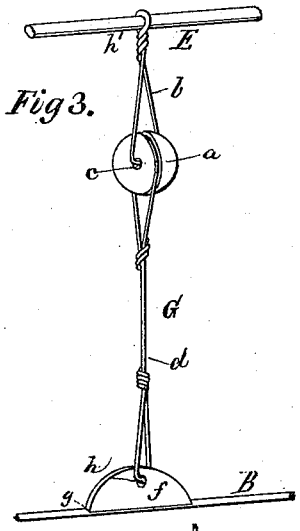
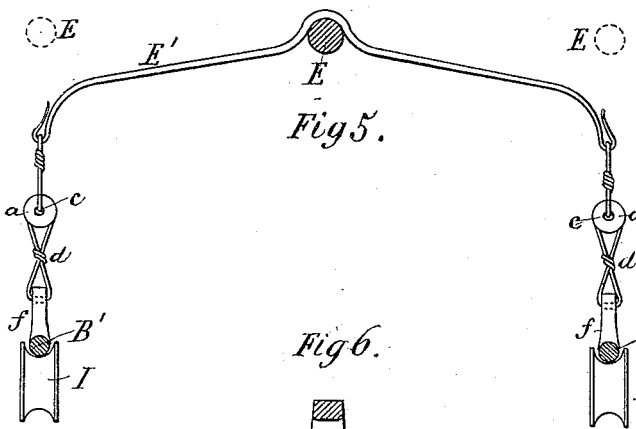
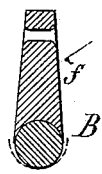
Witnesses:
J. P. Theo. Fang
E. J. Fenwick
Inventor:
Walter B. Marks
John G. Lauer
Robert R. Ralston
by their attys
Mason, Fenwick & Lawrence

UNITED STATES PATENT OFFICE.

WALTER BOOTH MARKS, JOHN GEORGE LAUER, AND ROBERT RANDOLPH RALSTON, OF RICHMOND, VIRGINIA.

SUSPENDING DEVICE FOR ELECTRIC WIRES.

SPECIFICATION forming part of Letters Patent No. 441,312, dated November 25, 1890.

Application filed July 24, 1890. Serial No. 359,757. (No model.)

*To all whom it may concern:*

Be it known that we, WALTER BOOTH MARKS, JOHN GEORGE LAUER, and ROBERT RANDOLPH RALSTON, citizens of the United States, residing at Richmond, in the county of Henrico and State of Virginia, have invented certain new and useful Improvements in Safety-Suspenders for Overhead Electrical Conducting-Wires of Street-Car Electric Motors; and we do hereby declare the following to be a full, clear, and exact description of the invention, such as will enable others skilled in the art to which it appertains to make and use the same.

Our invention relates to overhead electrical conducting-wires for street-cars; and it consists in a novel and useful means for suspending such wires, whereby they are prevented from destroying the lives of human beings and the lower animals in case of breakage, and thus one of the greatest objections to overhead electrical street-car wires is overcome.

Since the introduction of electricity as a motor for street-cars the lives of numerous human beings have been destroyed, as well as of horses, and much valuable property also, such accidents resulting from the ends of broken electrical conducting-wires descending to the ground and killing persons or animals, either by striking the persons or the lower animals, or by persons accidentally coming in contact with them.

Our invention is an improvement on devices heretofore devised for avoiding the above-mentioned objections to electrical motors for street-cars, and it, besides rendering it impossible for the ends of broken wires to descend to a dangerous distance below the altitude at which the line or line-wires may be suspended and causing such accidents as are above mentioned, it greatly improves and simplifies the means heretofore employed for such purpose.

In the accompanying drawings, Figure 1 represents a portion of an electrical street-railway, an electric car, and our improved suspending contrivance, and Fig. 2 is a broken perspective view, on a larger scale, illustrating our invention. Fig. 3 is a detail perspective view illustrating our invention. Fig. 4 is another detail perspective view showing one of the suspending devices made in two parts below the insulator, so as to slip slightly upon one another instead of in one part, as in the other figures. Fig. 5 is an end and cross-sectional view illustrating our suspending contrivance as adapted for a road having two tracks, the dotted circles in this view being intended to represent two main supporting-wires for the suspenders instead of a single central wire, as shown in full lines in this figure. Fig. 6 is a cross-section of one of the electrical wires and the plate which is soldered to it and connected to a suspender.

A in the drawings represents posts on opposite sides of the center of the street and of usual height, which height is sufficient for the application of our invention.

B represents the ordinary electrical conducting-wire, suspended at intervals along the street upon cross-wires C by means of links D, as usual.

E is a strong supporting-wire arranged some distance above the conducting-wire and supported upon strong cross rods or bars F, which are attached to the upper ends of the posts, as shown.

G G represent spaced suspenders, connected to the supporting-wire E and to the conducting-wire B. The suspenders G are constructed with insulating portions $a$, and to these portions the upper links $b$ of the suspender are connected by being passed through central eyes $c$ of the insulators $a$, as shown, while the lower links $d$ of the suspenders are passed around the outside of the insulators, as illustrated. At the lower ends of the suspenders segmental plates $f$ are provided, and in the lower edges of these plates nearly semicircular grooves, as $g$, are formed, in order that they may be fitted around the upper surface of the conducting wire or wires B and securely soldered thereto.

The suspenders G are loosely connected at $h$ to the plates $f$ and rigidly connected at $h'$ to the supporting wire or wires E, and intermediate of these points of connection—say at $a$—the parts $b$ and $d$ of the suspenders are loosely coupled by the insulator portion and have free articulation, so as to accommodate the up-and-down vibrations of the conducting-wire B, caused by the action of the trolley I upon said wire during the travel of the electrically-propelled car J upon the rails K. The preferable distance apart of the suspenders G in the space between two pairs of posts is about ten feet, which distance is about five feet less than that between the top of the car J and the electrical conducting-wire B, and thus in the event of the wire B breaking—say between the points $x\,x$—its end $x'$ (shown by dotted lines) will be held suspended not only above the ground, but also above the car, and therefore cannot possibly do any damage to persons either about the car or on the ground, nor to animals traveling along the street.

In using our invention on a double track two supporting-wires, as E E, (shown by dotted circles in Fig. 5,) may be employed; or, if desirable, a single central supporting-wire E, provided with a bail E', may be adopted.

In Fig. 5 we have shown how the trolley may be transferred from the wire B' to the wire B, and vice versa.

In Fig. 4 at L we have shown the lower portion $d$ of a suspender constructed in two parts and with eyes forming shoulders, and one part passing through an eye of the other part, and thus one part slipping upon the other. By this construction the suspender can automatically shorten itself, and thus accommodate any upward deflection of the electrical conducting-wire by the trolley I. This, however, may not be necessary, as the suspenders are flexible at the points $a$ and $c$.

It will be understood that the supporting-wire E is to be of sufficient diameter to sustain the weight of the smaller conducting-wire B, and the relative proportions of these wires may be for the conducting-wire one-quarter of an inch, and the supporting-wire a half or three-quarters of an inch; but we do not confine ourselves to any precise proportions.

What we claim as our invention is—

1. In an electrical street-car motor, in combination, the electrical conducting-wire, the supporting-wire above the electrical wire, and flexible suspenders between the posts upon which the supporting and conducting wires are sustained, said suspenders comprising, respectively, an insulating portion $a$, having a transverse eye and a grooved periphery and being spaced at short intervals between the posts, substantially as described.

2. The intermediate suspenders, comprising, respectively, an insulating portion having a transverse eye and a grooved periphery, and upper and lower connecting and suspending portions $b$ and $d$, substantially as described.

3. The combination of the supporting-wire, the electrical conducting-wire, and the intermediate insulating-suspenders provided with grooved plates at their lower ends, which are fitted upon and soldered to the electric conducting-wire, said suspenders comprising parts $b$ and $d$, coupled loosely to each other by an insulating portion having a transverse eye and grooved periphery, substantially as described.

4. The combination of insulating and suspending intermediate wires which are extensible and contractible, and thereby capable of automatically accommodating themselves to the trolley, the electrical conducting-wire, and the supporting-wire, substantially as described.

5. The combination of the single non-conducting supporting-wire, two electrical conducting-wires, insulating-suspenders, and a bail, substantially as described.

In testimony whereof we hereunto affix our signatures in presence of two witnesses.

WALTER BOOTH MARKS.
JOHN GEORGE LAUER.
ROBERT RANDOLPH RALSTON.

Witnesses:
JAMES B. HARVIE,
J. H. BROWN.